Patented Feb. 10, 1942

2,272,470

UNITED STATES PATENT OFFICE 2,272,470

STABILIZED HIGH FILM STRENGTH LUBRICATING OILS

Bert H. Lincoln and Waldo L. Steiner, Ponca City, Okla., assignors to Continental Oil Company, a corporation of Delaware No Drawing. Original application February 19, 1936, Serial No. 64,706. Divided and this application November 24, 1939, Serial No. 305,940

7 Claims. (Cl. 252—54)

Our invention relates to a stabilized high film strength lubricating oil, and more particularly to a composition of matter comprising a hydrocarbon oil of increased film strength obtained by the addition of a chlorinated organic compound, which composition has been stabilized by the addition of a halogenated derivative of naphthalene.

This application is a divisional application of our co-pending application Serial No. 64,706, filed February 19, 1936, Patent No. 2,217,173, October 8, 1940.

It is known that the addition of small quantities of chlorinated organic compounds in general to a hydrocarbon oil will impart thereto an increased film strength. As ordinarily prepared, the chlorinated carbon compounds are refined after chlorination by blowing with air to remove excess chlorine and hydrocarbon acid. The chlorinated compounds are then given a wash with a solution of a reducing or oxidizing agent to remove labile chlorine. After water washing and drying, the chlorinated compounds are fairly stable with respect to the development of hydrochloric acid in storage. The degree of stability is largely dependent on the severity of the oxidizing or reducing treat given. The severity of this treat in turn is governed by the amount of treating loss which ensues with said treating. In order to economically refine a chlorinated compound as for example, a chlorinated ester of a fatty acid, this treating should not be too severe. Therefore, the finished product is never as stable as is desired especially if it is to be stored in iron containers during the warm months of the year. What is true of the chloro-ester is true broadly for all chlorinated organic compounds in general. We find that chlorinated compounds and esters in particular, stored under these conditions, quite often develop hydrochloric acid in a few weeks' time. When this occurs the product turns dark and some of the esters hydrolize, thereby increasing the free fatty acid. This is obviously objectionable.

When samples of the ordinarily prepared and refined chloro-esters are exposed to sunlight, either directly or indirectly, for a few days in glass containers, some hydrochloric acid develops and tends to cause hydrolysis. This is analogous to the development of hydrochloric acid in the dark in iron containers during the warm months. A test was developed to correlate the stability of the chloro-esters in sunlight and the stability in iron containers. Standard one-pound grease cans were cleaned and 25 cc. of the chloro-esters to be tested were poured into them. The cans were then held at 240° F. until they developed hydrochloric acid and then turned dark. It was found that 1½ hours without change at 240° F. in this test was equivalent to about three weeks exposure to indirect sunlight.

We have found that a number of compounds, when added to halogenated organic compounds in small amounts, greatly increased the period of time which was required to induce the formation of hydrochloric acid under the conditions of these two tests. The compounds which had the greatest effect were the terpene hydrocarbons. In particular, pinene was found to be an extremely potent stabilizer. For example, the straight methyl chloro stearate developed a strong odor of hydrochloric acid in less than a month's time. A blend of one percent of pinene in the same chloro-ester did not develop a trace of hydrochloric acid after a year's exposure. The length of time before which hydrochloric acid developed in the iron can test at 240° F. described above, was increased by 900 percent by the addition of one percent of pinene.

Other terpene hydrocarbons which can be employed are myrcene, ocimene, limonene, hemiterpenes, di-terpenes, polyterpenes, and the like. Terpene derivatives are also of value although they are not as effective as the hydrocarbons. Examples of these are geraniol, citronellol, cineol, carvine, citrol, and the like.

A second class of compounds which we have discovered very effective as stabilizers for halogenated compounds was the hydrogenated derivatives of naphthalene, di-, tetra-, hexa-, octo-, and deca-hydronaphthalene. For example, one percent of tetra-hydronaphthalene improved the stability of methyl chloro stearate 800 percent in the test where the samples were exposed to sunlight.

A third class of compounds which has considerable stabilizing influence on halogenated compounds are the hydroxy aromatic compounds. One percent of phenol, para-cresol, naphthol, and para-hydroxy diphenyl each increased the stability of the chloro esters by 500 to 900 percent. Derivatives of the phenols are also operative. One percent of ortho nitro phenol increased the stability of methyl chloro stearate by 800 percent.

While a number of other compounds have some stabilizing influence on chloro-esters, the above three groups are outstanding. Three compounds not included in these groups, which have considerable merit, are cholesterol, ethyl abietate, and acetal. Compounds which react with hydrochloric acid easily and hold the halogen acid firmly have been found to be of advantage in practicing our invention. Some of the other halogenated organic compounds which have been stabilized by the previously mentioned stabilizing agents are:

Halogenated aliphatic hydrocarbons such as halogenated wax and halogenated petroleum oils; halogenated aromatic hydrocarbons such as halogenated benzene, naphthylene, diphenyl, anthracene, and the like; halogenated aliphatic aromatic, and hetero cyclic alcohols, aldehydes, ketones, acids, esters, ethers, etc.; mixtures of various halogenated organic compounds with each other and with amines, nitro compounds, phosphorus containing compounds, thio compounds, etc.

In practicing this invention, quantities of the stabilizer of as small as .01 percent of the chlorinated carbon compound content may be used with some good effects. The more of the stabilizer used with the chloro-ester, the more stable the resulting blend will be, however, the near maximum effect is obtained with one percent or less. For example, .1 percent of pinene increased the stability in the iron can test 100 percent, while .25 percent increased the stability 500 percent and one percent increased the stability only 900 percent.

For each stabilizer there is a percentage which is most effective in improving the stability most economically. The stabilizer may be incorporated into the halogenated organic compound at any period during its manufacture after air blowing (following chlorination) to remove excess chlorine. It is preferable, however, to add it immediately after the final drying process.

The stabilizers described in this invention not only act effectively in stabilizing organic chlorine compounds in general, and especially chloro-esters of fatty acids, but also reduces the corrosiveness of blends of halogenated organic compounds in lubricating oil. For example, a blend of one percent of fairly stable methyl chloro stearate in oil caused a loss of 20 mg. per 100 sq. cm. of bearing metal in a corrosion test conducted at 300° F. for forty-eight hours. A blend of one percent of the same ester stabilized with one percent of pinene in oil in the same test caused a loss of 8 mg. per 100 sq. cm. of the same bearing material. Therefore, the stabilizer in the chloro ester gives a lubricating oil blend of improved stability.

Having thus described our invention, we claim:

1. A composition of matter comprising in combination a lubricating oil, a small quantity of a chlorine containing carbon compound and from .001 of 1 percent to 1 percent by weight of a hydrogenated derivative of naphthalene.

2. A composition of matter comprising in combination a major portion of a lubricating oil, from .5 to 1 percent to 10 percent by weight of a chlorinated aliphatic ester and from .001 of 1 percent to 1 percent by weight of a hydrogenated derivative of naphthalene.

3. A composition of matter comprising in combination a lubricating oil, a small quantity of a chlorine containing carbon compound and from .001 of 1 percent to 1 percent by weight of tetrahydronaphthalene.

4. A composition of matter comprising in combination a lubricating oil, a small quantity of a chlorine containing carbon compound and from .001 of 1 percent to 1 percent by weight of decahydronaphthalene.

5. The composition of matter comprising in combination a chlorinated aliphatic ester and from .001 of 1 percent to 5 percent of a hydrogenated derivative of naphthalene.

6. A composition of matter comprising in combination a lubricating oil, a small quantity of a halogen bearing carbon compound, and from .001 per cent to 5 percent by weight of a hydrogenated derivative of naphthalene.

7. A composition of matter comprising in combination a lubricating oil, a small quantity of a halogenated aliphatic ester, and from .001 percent to 5 percent by weight of a hydrogenated derivative of naphthalene.

BERT H. LINCOLN.
WALDO L. STEINER.